US009588579B2

(12) United States Patent
Itou et al.

(10) Patent No.: US 9,588,579 B2
(45) Date of Patent: Mar. 7, 2017

(54) ELECTRONIC CONTROL UNIT

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Akito Itou, Kariya (JP); Naoki Maeda, Nisshin (JP); Masayuki Tsuda, Nagakute (JP); Atsuko Yokoyama, Nagoya (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/873,493

(22) Filed: Oct. 2, 2015

(65) Prior Publication Data
US 2016/0098077 A1    Apr. 7, 2016

(30) Foreign Application Priority Data
Oct. 6, 2014    (JP) ................................. 2014-205682

(51) Int. Cl.
G06F 1/00    (2006.01)
G06F 1/32    (2006.01)
G06F 1/26    (2006.01)

(52) U.S. Cl.
CPC ............ G06F 1/3296 (2013.01); G06F 1/263 (2013.01); G06F 1/3206 (2013.01); G06F 1/3243 (2013.01)

(58) Field of Classification Search
CPC ....... G06F 1/3296; G06F 1/263; G06F 1/3206

USPC ............................ 323/22; 320/155; 713/320
See application file for complete search history.

(56) References Cited

U.S. PATENT DOCUMENTS

| 8,098,056 B2 * | 1/2012 | Yamazaki | H02M 3/157 |
| | | | 323/222 |
| 8,543,859 B2 * | 9/2013 | Chueh | G06F 1/28 |
| | | | 326/93 |
| 2005/0073370 A1 * | 4/2005 | Mitsuda | H03K 3/0231 |
| | | | 331/36 C |

(Continued)

FOREIGN PATENT DOCUMENTS

| JP | 2000-287436 A | 10/2000 |
| JP | 3156736 B2 | 4/2001 |
| JP | 2013-25471 A | 2/2013 |

*Primary Examiner* — Aurel Prifti
(74) *Attorney, Agent, or Firm* — Posz Law Group, PLC

(57) ABSTRACT

An electronic control unit includes a microcomputer, a monitoring unit, a clock-generating oscillator circuit, a first power circuit supplying power to the microcomputer, and a second power circuit supplying power to the monitor microcomputer. The first power circuit includes a first switching power source including a first transistor and a first series power source including a second transistor. The second power circuit includes a second switching power source including a third transistor and a second series power source including a fourth transistor. Further, the ECU includes a power control circuit controlling each of the transistors and an oscillation stop detection circuit. When a stop of oscillation is detected, the power control circuit switches ON the second transistor, and switches OFF the fourth transistor, thereby diminishing a no-monitoring period of the microcontroller during a stop of the clock output.

9 Claims, 8 Drawing Sheets

(56) References Cited

U.S. PATENT DOCUMENTS

| | | | | |
|---|---|---|---|---|
| 2011/0145624 A1* | 6/2011 | Rychlik | ............... | G06F 1/3203 |
| | | | | 713/600 |
| 2013/0049459 A1* | 2/2013 | Hatanaka | .............. | H02M 3/155 |
| | | | | 307/10.1 |
| 2013/0205126 A1* | 8/2013 | Kruglick | ................ | G06F 1/324 |
| | | | | 713/1 |
| 2013/0246820 A1* | 9/2013 | Branover | .............. | G06F 1/3296 |
| | | | | 713/320 |
| 2014/0225573 A1* | 8/2014 | Watanabe | ................ | H02J 7/04 |
| | | | | 320/155 |

* cited by examiner

ELECTRONIC CONTROL UNIT

CROSS REFERENCE TO RELATED APPLICATION

The present application is based on and claims the benefit of priority of Japanese Patent Application No. 2014-205682, filed on Oct. 6, 2014, the disclosure of which is incorporated herein by reference.

TECHNICAL FIELD

The present disclosure generally relates to an Electronic Control Unit (ECU) having a microcomputer, a microcomputer monitor, a power circuit for the microcomputer, and a power circuit for the microcomputer monitor.

BACKGROUND INFORMATION

The ECU having two microcomputers together with a first power circuit that supplies power to one microcomputer and a second power circuit that supplies power to the other microcomputer is disclosed in a Japanese patent document, JP 2013-25471 A (patent document 1).

As disclosed in the patent document 1, the two microcomputers may be configured to monitor the one by using the other. One of the two microcomputers may simply be designated as a Microcontroller Unit (MCU) in the following, and the other one of the two microcomputers may be designated as a monitoring unit in such context.

Further, as for a power circuit for the microcomputer, a switching power source that has a transistor and steps down a voltage of an external power source by using a clock as well as a series power source that also has a transistor and steps down a voltage of the switching power source are known. Furthermore, the power source for supplying power to the microcomputer (i.e., a microcomputer power circuit) and the power source for supplying power to the monitoring unit (i.e., a monitor power circuit) may be provided with a clock from the same oscillator circuit.

In such configuration, when the output of the clock from the oscillator circuit stops, (i.e., when the oscillation of the oscillator circuit stops), a Pulse Width Modulation (PWM) signal having a preset duty cannot be generated, and the transistors in both of the microcomputer power circuit and the monitor power circuit will not be operable without the clock from the oscillator circuit.

For example, when the oscillation of the oscillator stops at a transistor OFF timing, the transistor stays in the OFF state, thereby causing a fall of the output voltage of the microcomputer power circuit and a fall of the output voltage of the monitor power circuit. Depending on the drive state of the microcomputer and the monitoring unit, as well as the charge state of the capacitor for the stability of the power source, the power source of the monitoring unit may fall prior to the fall of the power source of the microcomputer, which causes a no-monitoring period for the microcomputer. In such case, due to the abnormal calculation of the microcomputer, for example, an unintended control may be performed (e.g., a wrong torque instruction is output).

SUMMARY

It is an object of the present disclosure to provide an electronic control unit that prevents a no-monitoring period of the microcomputer when the oscillator circuit stops to output the clock signal.

The disclosure of the technical feature in the following is for achieving the above-described purposes. The numerals in parentheses of claims section indicates example relationships of the claim terms with the components in the embodiment, thereby understood as not limiting the scope of the disclosure.

In one aspect of the present disclosure, the ECU includes a microcomputer, a monitoring unit that monitors the microcomputer, an oscillator circuit that generates and outputs a clock, and a microcomputer power circuit. The microcomputer power circuit includes a switching power source having a first transistor that switchingly operates on a clock-generated signal and lowering a voltage from an external power source, and a series power source having a second transistor that lowers an output voltage of the switching power source and supplying the output voltage to the microcomputer. The ECU also includes a monitor power circuit that includes a switching power source that has a third transistor that switchingly operates on a clock-generated signal and that lowers a voltage from the external power source, and a series power source that has a fourth transistor that lowers an output voltage of the switching power source and supplying the output voltage to the monitoring unit. The ECU further includes a control circuit that controls each of the transistors, and an oscillation stop detection circuit detecting a stop of a clock output from the oscillator. The control circuit performs a control to switch the second transistor to ON and to switch the fourth transistor to ON when the stop of the clock output is detected.

According to such configuration, the oscillation stop detection circuit detects the stop of the clock output from the oscillator circuit. When the stop of the clock output is detected, the control circuit switches the second transistor to OFF and switches the fourth transistor to ON. In other words, the series power source of the microcomputer power circuit is put in an OFF state, in which no power supply is provided for the microcomputer, and the series power source of the monitor power circuit is put in an ON state, in which an electric power is suppliable to the monitoring unit. Therefore, when the output of the clock from the oscillator circuit is caused, the microcomputer is stopped first prior to the stop of the monitoring unit, thereby achieving that no-monitoring period of the microcomputer during which the microcomputer is not monitored is prevented.

In another aspect of the present disclosure, when the stop of the clock output is detected, the control circuit, while stopping the switching of the transistors, puts the first transistor in an OFF state, and puts the third transistor in an ON state.

When the stop of the clock output is observed, the transistors in the switching power sources of the both of the microcomputer power circuit and the monitor power circuit will not perform a switch operation. In such state, (i.e., in a switch stop state) the first transistor of the microcomputer power circuit is switched OFF, and the third transistor of the monitor power circuit is switched ON. That is, when the third transistor is put in an ON FIX state, the output voltage of the switching power source is supplied to the series power source in the monitor power circuit. Therefore, the fall of the power supply (i.e., the voltage) supplied to the monitoring unit is prevented, thereby more securely preventing the no-monitoring period of the microcomputer.

In yet another aspect of the present disclosure, the ECU includes a microcomputer, a monitoring unit that monitors the microcomputer, an oscillator circuit that generates and outputs a clock, and a microcomputer power circuit. The microcomputer power circuit includes a switching power source having a first transistor that switchingly operates on a clock-generated signal and lowering a voltage from an external power source, and a series power source having a second transistor that lowers an output voltage of the switching power source and supplying the output voltage to the microcomputer. The ECU also includes a monitor power circuit that includes a switching power source that has a third transistor that switchingly operates on a clock-generated signal and that lowers a voltage from the external power source, and a series power source that has a fourth transistor that lowers an output voltage of the switching power source and supplying the output voltage to the monitoring unit. The ECU further includes a control circuit that controls each of the transistors, and an oscillation stop detection circuit detecting a stop of a clock output from the oscillator.

The control circuit performs, in a switching operation stopped state of the transistors, a control to switch the first transistor to OFF, to switch the second transistor to ON, to switch the third transistor to ON, and to switch the fourth transistor to ON when the stop of the clock output is detected.

According to such configuration, the oscillation stop detection circuit detects the stop of the clock output from the oscillator circuit. When the clock output is stopped, the transistors of the switching power source in both of the microcomputer/monitor power circuits will not perform a switch operation.

In the present disclosure, while putting the transistors in the switch stop state, the first transistor of the microcomputer power circuit is switched OFF, and the third transistor of the monitor power circuit is switched ON. That is, when the third transistor is put in an ON FIX state, the output voltage of the switching power source is supplied to the series power source in the monitor power circuit. Therefore, the fall of the power supply (i.e., the voltage) supplied to the monitoring unit is prevented, thereby more securely preventing the no-monitoring period of the microcomputer.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Hereafter, embodiments of the present disclosure are described based on the drawings. The like numbers in each of the embodiments indicate like parts.

First Embodiment

The configuration of an electronic control unit concerning the present embodiment is described with reference to FIGS. 1 and 2.

Figure 1:
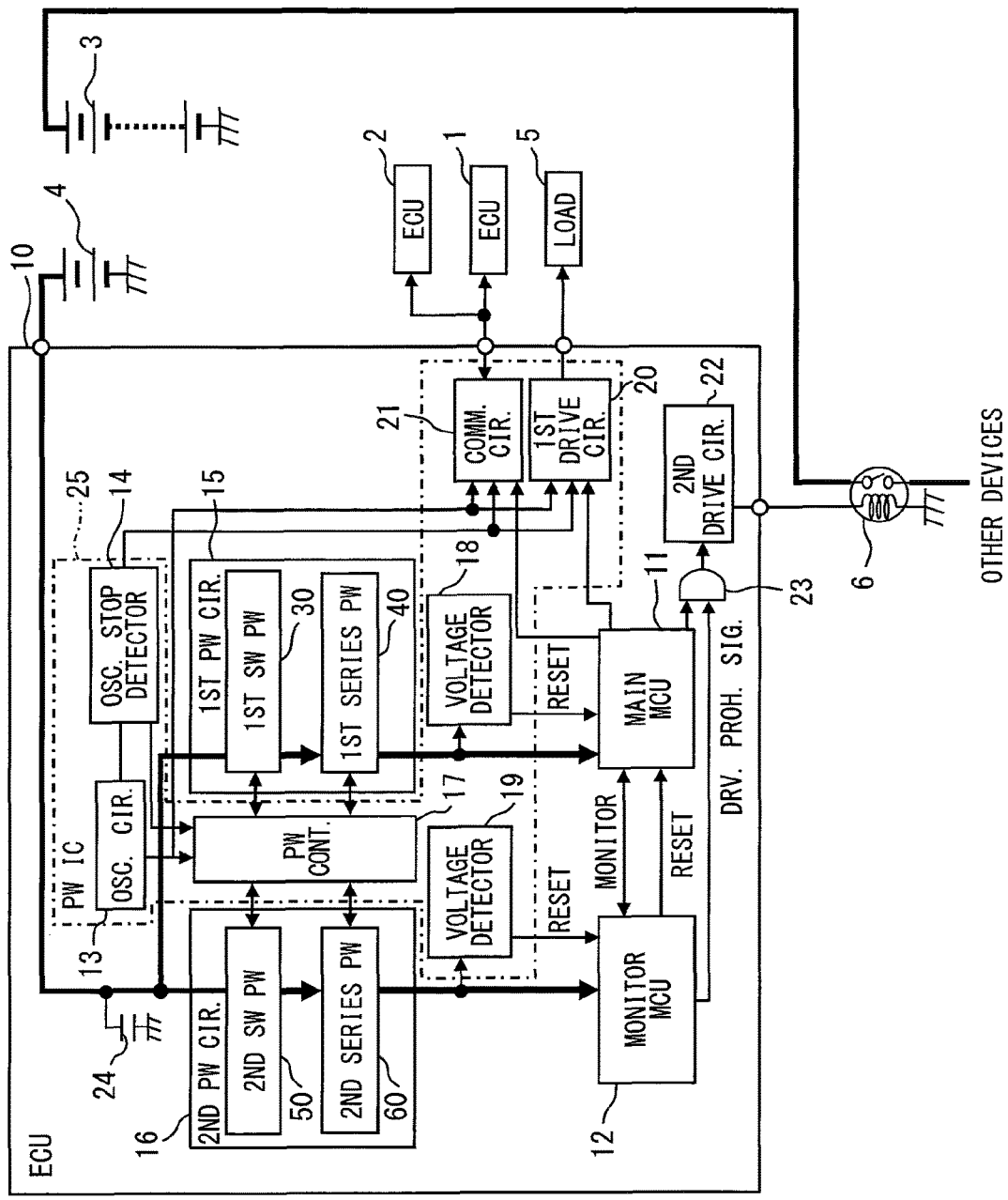
FIG. 1 is a block diagram of a configuration of an electronic control unit concerning the first embodiment of the present disclosure.

An electronic control unit 10 shown in FIG. 1 is disposed in a hybrid vehicle that is provided with an internal-combustion engine and a motor as a driving power source for the travel of the vehicle.

The electronic control unit 10 serves as a Hybrid Vehicle Electronic Control Unit (HVECU) that controls an entire drive system of the hybrid vehicle for an optimum travel of the hybrid vehicle, which is realized by managing ECU 1 (engine ECU), which controls the internal-combustion engine, ECU 2 (Motor Generator ECU), which control a motor generator containing the above-mentioned motor and the like.

The electronic control unit 10 is provided with a main microcomputer 11, a monitor microcomputer 12, an oscillator circuit 13, an oscillation stop detection circuit 14, a first power circuit 15, a second power circuit 16, and a power control circuit 17.

The main microcomputer 11 corresponds to a microcomputer, and the monitor microcomputer 12 corresponds to a monitoring unit, and the first power circuit 15 corresponds to a microcomputer power circuit, and the second power circuit 16 corresponds to a monitor power circuit, and the power control circuit 17 corresponds to a control circuit.

The electronic control unit 10 is further provided with voltage detector circuits 18 and 19, a first drive circuit 20, a communication circuit 21, a second drive circuit 22, an AND circuit 23, and a capacitor 24.

The first drive circuit 20 and the communication circuit 21 respectively correspond to a driven circuit using a clock, and the second drive circuit 22 corresponds to a drive circuit.

In the present embodiment, the oscillator circuit 13, the oscillation stop detection circuit 14, the power control circuit 17, the voltage detector circuits 18 and 19, the first drive circuit 20, and the communication circuit 21 are aggregated into one chip, to provide a power Integrated Circuit (IC) 25.

The main microcomputer 11 and the monitor microcomputer 12 are a microcomputer, respectively, which are provided with Central Processing Unit (CPU), Read-Only Memory (ROM), Random Access Memory (RAM), a register, Input/Output (I/O), and the like.

In the main microcomputer 11 and the monitor microcomputer 12, CPU performs a signal processing according to a control program stored in ROM and various data and the like obtained via a bus while utilizing a temporary memory function of RAM and/or the register. Further, the signal obtained by such signal processing is outputted via an inter-microcomputer communication between two or more microcomputers, or is outputted to the bus. In such manner, the main microcomputer 11 and the monitor microcomputer 12 perform various functions.

The main microcomputer 11 controls an entire drive system in an integrated manner (i.e., playing a main roll of such control in the vehicle). For example, the main microcomputer 11 performs a charge and discharge control of a driving battery 3 of high voltage (e.g., 200V) disposed in the hybrid vehicle at the time of the travel of the vehicle.

In the charge and discharge control of the driving battery 3, the min microcomputer 11 acquires, from a battery ECU (not illustrated), a charge-and-discharge state (i.e., State of Charge) of the driving battery 3, and a chargeable and dischargeable amount of the driving battery 3 is computed.

Further, when generating a driving torque for the hybrid vehicle, the required torque is distributed to the motor and the engine according to the dischargeable amount of the driving battery 3, if the battery 3 is dischargeable.

On the other hand, when the driving battery 3 is chargeable at the time of braking of the hybrid vehicle, which generates a braking torque, the main microcomputer 11 operates a regeneration brake for the charging of the driving battery 3. In such case, the main microcomputer 11 splits the required braking torque into the regeneration braking torque by the charging and the mechanical braking torque by a non-illustrated brake device, for an appropriate braking.

The monitor microcomputer 12 monitors whether the main microcomputer 11 is operating normally. For example, the monitoring by the monitor microcomputer 12 checks whether or not the main microcomputer 11 is having a watchdog abnormality, a communication abnormality, or an abnormality in the calculation function.

The monitor microcomputer 12 may control the entire drive system in an integrated manner as a main role player, or as a supportive role player, or may perform other range of control other than the entire drive system.

In the present embodiment, the monitor microcomputer 12 performs a shift-related control in which a shift position is automatically put in a park position when the vehicle power supply is switched OFF.

According to the present embodiment, the monitoring unit is provided as the monitor microcomputer 12, which enables a mutual monitoring of the main microcomputer 11 and the monitor microcomputer 12 with each other. Further, the monitor microcomputer 12 resets the main microcomputer 11, when the power source voltage (i.e., an output voltage V4 mentioned later) supplied to the main microcomputer 11 which is being monitored falls to be less than a preset value.

The oscillator circuit 13 is provided with a crystal oscillator, for example, and generates a clock of predetermined frequency. According to the present embodiment, the clock with a frequency of 1 MHz is generated. The clock outputted from the oscillator circuit 13 is inputted to the power control circuit 17, to the first drive circuit 20, and to the communication circuit 21.

The oscillation stop detection circuit 14 outputs an oscillation stop signal to the power control circuit 17, to the first drive circuit 20, and to the communication circuit 21 by determining whether an output of the clock from the oscillator circuit 13 is stopped. That is, when the output of the clock is detected, (i.e., when the stop of the oscillation in the oscillation circuit is detected), the oscillation stop signal is output.

More practically, the oscillation stop detection circuit 14 determines the stop of the oscillation when the clock frequency outputted from the oscillator circuit 13 falls to be less than 700 kHz, for example, and outputs the oscillation stop signal.

The first power circuit 15 lowers (i.e., steps down) the voltage of the direct current (i.e., hereafter indicated as a battery voltage) supplied from an accessory battery 4 disposed in the hybrid vehicle, and supplies the stepped-down voltage to the main microcomputer 12 for the operation thereof. The first power circuit 15 has a first switching power source 30 and a first series power source 40. As for the first switching power source 30 and first series power source 40, a well-known product having a first transistor 31 and a second transistor 41, which are mentioned later, may be employable.

The first switching power source 30 and first series power source 40 respectively correspond to a switching power source and a series power source in the microcomputer power circuit.

Figure 2:
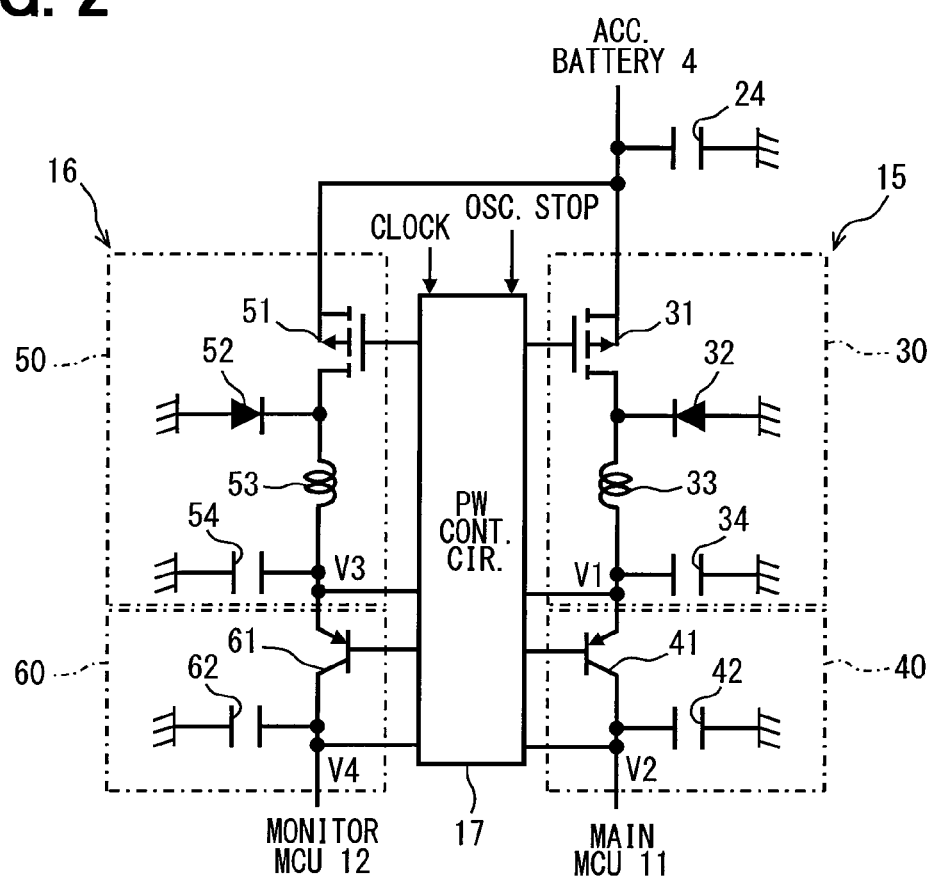
FIG. 2 is a schematic diagram of a power circuit and peripherals in FIG. 1.

As shown in FIG. 2, the first switching power source 30 has the first transistor 31, a diode 32, a coil 33, and a first capacitor 34. According to the present embodiment, the battery voltage of 12V is lowered to 6V by the first switching power source 30. The battery voltage is stabilized by the capacitor 24.

In FIG. 2, a p channel type Metal-Oxide-Semiconductor Field-Effect Transistor (MOSFET) is adopted as the first transistor 31, and the sauce of MOSFET is connected to a capacitor 24 side (i.e., to an accessory battery 4 side), and the drain is connected to the coil 33. Further, the gate of the first transistor 31 is connected to the power control circuit 17.

The diode 32 is connected to a junction point between the first transistor 31 and the coil 33. The diode 32 has its anode connected to the ground. Further, for the stabilization of an output voltage V1 of the first switching power source 30, the first capacitor 34 is connected to a downstream side of the coil 33. The first capacitor 34 accumulates the electric charge corresponding to the output voltage V1 of the first switching power source 30.

The first series power source 40 has a second transistor 41 and a second capacitor 42. According to the present embodiment, the voltage of the output voltage V1 (6V) of the first switching power source 30 is lowered to 5V by first series power source 40.

In FIG. 2, a pnp type bipolar transistor is adopted as the second transistor 41, the emitter of the bipolar transistor is connected to the first capacitor 34 of the first switching power source 30, and the collector of the bipolar transistor is connected to the main microcomputer 11. The base of the second transistor 41 is connected to the power control circuit 17. For the stabilization of an output voltage V2 of the first series power source 40, the second capacitor 42 is connected to a downstream side of the second transistor 41. The second capacitor 42 accumulates the electric charge corresponding to the output voltage V2 of the first series power source 40.

The second power circuit 16 lowers the battery voltage, and supplies it as a power for operating on the monitor microcomputer 12. The second power circuit 16 has a second switching power source 50 and a second series power source 60 just like the first power circuit 15. As the second switching power source 50 and the second series power source 60, a third transistor 51 and a the fourth transistor 61, both of which are well-known type to be mentioned later, are employable.

The second switching power source 50 and the second series power source 60 correspond to a switching power source and a series power source in the monitor power circuit recited.

As shown in FIG. 2, the second switching power source 50 has a third transistor 51, a diode 52, a coil 53, and a third capacitor 54. The second switching power source 50 lowers, just like the first switching power source 30, the battery voltage of 12V to 6V. As the third transistor 51, a p channel type MOSFET is adopted, and the sauce of MOSFET is connected to a capacitor 24 side (i.e., to an accessory battery 4 side), and the drain is connected to the coil 53. Further, the gate of the third transistor 51 is connected to the power control circuit 17.

The diode 52 is connected to a junction point between the third transistor 51 and the coil 53. The diode 52 has its anode connected to the ground. Further, for the stabilization of an output voltage V3 of the second switching power source 50, the third capacitor 54 is connected to a downstream of the coil 53. The third capacitor 54 accumulates the electric charge corresponding to the output voltage V3 of the second switching power source 50.

The second series power source 60 has a fourth transistor 61 and a fourth capacitor 62. According to the present embodiment, the four capacitors 34, 42, 54, and 62 have the same capacity.

The voltage of the output voltage V3 (6V) of the second switching power source 50 is lowered to 5V by the second series power source 60, in the same manner as the first series power source 40, lowering the output voltage V1.

As the fourth transistor 61, a pnp type bipolar transistor is adopted, and the emitter of the bipolar transistor is connected to the third capacitor 54 of the second switching power source 50, and the collector thereof is connected to the monitor microcomputer 12. The base of the fourth transistor 61 is connected to the power control circuit 17. For the stabilization of an output voltage V4 of the second series power source 60, the fourth capacitor 62 is connected to a downstream side of the fourth transistor 61. The fourth capacitor 62 accumulates the electric charge corresponding to the output voltage V4 of the second series power source 60.

The power control circuit 17 controls the drive of the first transistor 31, the second transistor 41, the third transistor 51, and the fourth transistor 61.

Normally (i.e., during a clock output period), the power control circuit 17 generates a PWM signal of a preset duty based on the clock inputted from the oscillator circuit 13, to control the switch operation of the first transistor 31, so that the output voltage V1 of the first switching power source 30 is set to 6V.

Similarly, the power control circuit 17 generates a PWM signal of a preset duty based on the clock inputted from the oscillator circuit 13, to control the switch operation of the third transistor 51, so that the output voltage V3 of third switching power source 50 is set to 6V.

According to the PWM signal, the first transistor 31 and the third transistor 51 are controlled to be switched ON and OFF periodically. For example, when the first transistor 30 is switched ON, the electric current based on the battery voltage flows through the first transistor 31. The electric current charges the first capacitor 34, accumulating energy in the coil 33.

When the first transistor 31 is switched OFF, the electric current flowing according to the battery voltage is intercepted. In such case, the energy accumulated in the coil 33 makes the electric current flow into the first capacitor 34 via the diode 32 and the coil 33. Since the first transistor 31 is switched ON and OFF by a preset duty, the output voltage V1 generated by the first capacitor 34 is set to 6V, which is lower than the battery voltage. The same applies to the second switching power source 50, which includes the third transistor 51.

Normally, the power control circuit 17 usually adjusts a base current of the second transistor 41, so that the output voltage V2 of the first series power source 40 is set to 5V. Similarly, the base current of the fourth transistor 61 is adjusted, so that the output voltage V4 of the second series power source 60 is set to 5V.

For example, the power control circuit 17 adjusts the base current of the second transistor 41 (i.e., a pnp type bipolar transistor), so that the output voltage V2 of the first series power source 40 is set to 5V. Since the electric current corresponding to the base current flows to the second transistor 41, the electric current flowing through the second transistor 41 charges the second capacitor 42. Thereby, the output voltage V2 generated by the second capacitor 42 is set to 5V, which is lower than the output voltage V1. The same applies to the second series power source 60 which has the fourth transistor 61.

When the oscillation stop signal is inputted from the oscillation stop detection circuit 14, that is, when the stop of the clock output is detected, the power control circuit 17 cannot generate the PWM signal of a preset duty based on the clock.

During the oscillation stop period, the power control circuit 17 of the present embodiment performs the following controls (i.e., to switch the first transistor 31, the second transistor 41, and the third transistor 51 to OFF and to switch only the fourth transistor 61 to ON). As for the fourth transistor 61, an ON state of the fourth transistor 61 receives a feedback control (i.e., a half-ON control), so that the output voltage V4 is set to a constant voltage of 5V.

Regarding the first transistor 31 and the third transistor 51, both of the transistors 31 and 51 are switched OFF in a switching stopped state (i.e., switching of both of those transistors is disabled). Regarding the fourth transistor 61, since the fourth transistor 61 is switched ON (i.e., stays in an ON state), the fourth transistor 61 is operable with the energy accumulated in the third capacitor 54.

During the oscillation stop period, which controls the fourth transistor 61 in an ON state and puts the third transistor 51 in an OFF state, the energy accumulated in the third capacitor 54 decreases as time lapses, thereby disabling the operation of the fourth transistor 61 when the output voltage V3 falls to be less than 1.5V, for example.

The voltage detector circuit 18 outputs, to the main microcomputer 11, a reset signal RST1 for the reset of the main microcomputer 11, when the circuit 18 detects a fall of the output voltage V2 which is supplied from the first power circuit 15 to the main microcomputer 11 to be less than 4V, for example.

On the other hand, the voltage detector circuit 19 output, to the monitor microcomputer 12, a reset signal RST2 for the reset of the monitor microcomputer 12, when the circuit 19 detects a fall of the output voltage V4 which is supplied from the second power circuit 16 to the monitor microcomputer 12 to be less than 4V.

Both of the first drive circuit 20 and the communication circuit 21 are driven with instructions of the main microcomputer 11 based on the clock generated by the oscillator circuit 13, and the signal is outputted from the oscillator 13 to an outside of the electronic control unit 10.

The first drive circuit 20 is a circuit for driving a load 5. According to the present embodiment, a main relay serving as the load 5 is opened and closed. The main relay is a relay for supplying a power (12V) to the above-mentioned ECUs 1 and 2 etc. from the accessory battery 4.

The first drive circuit 20 controls (i.e., opens and closes) the load 5 (i.e., the main relay) according to the instructions from the main microcomputer 11 in a clock-inputted state.

The communication circuit 21 is a circuit for performing communications between the electronic control unit 10 and other ECUs (e.g., ECUs 1 and 2). The communication circuit 21 performs communications according to the communication methods of LIN (i.e., Local Interconnect Network) and CAN (Controller Area Network), for example.

The second drive circuit 22 is a circuit which drives a load according to the instructions of the main microcomputer 11. In the present embodiment, a system main relay 6 is opened and closed as the load. The system main relay 6 is a relay which electrically connects or disconnects the driving battery 3 and various devices (i.e., high-voltage circuits, e.g., an inverter). The second drive circuit 22 receives an output from the AND circuit 23.

The AND circuit 23 receives an instruction signal from the main microcomputer 11 and from the monitor microcomputer 12. When both of the instruction signals from the main microcomputer 11 and the monitor microcomputer 12 prohibit the drive of the second drive circuit 22 (i.e., when both of the two signals instruct a switch OFF (i.e., an open state) of the system main relay 6), the AND circuit 23 outputs a signal which prohibits the drive of the second drive circuit 22.

Figure 3:
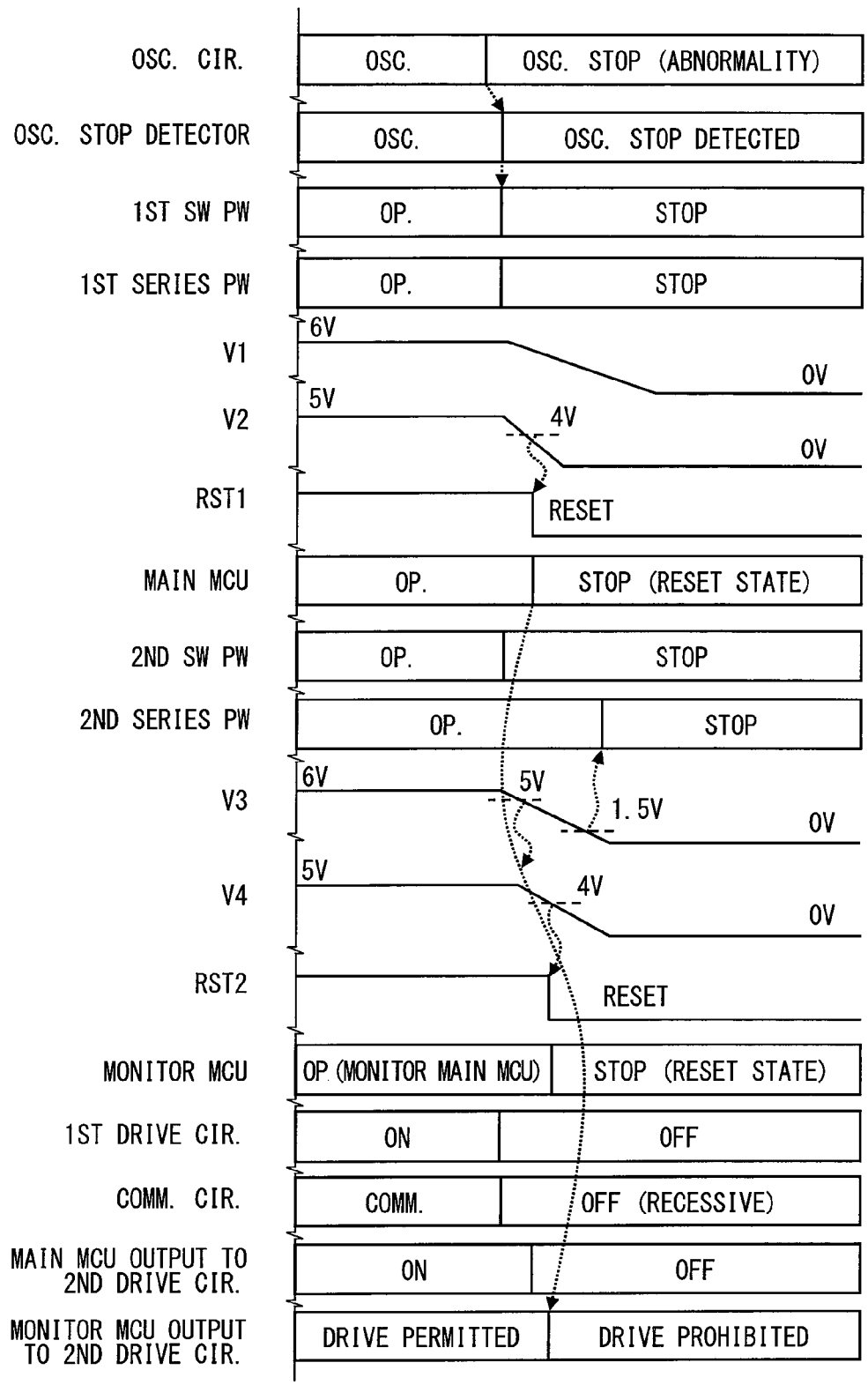
FIG. 3 is a timing chart of an operation state of a main microcomputer and other components.

Next, based on the timing chart shown in FIG. 3, the operation of the above-mentioned electronic control unit 10 is described.

When the oscillator circuit 13 oscillates (i.e., generates a clock), as shown in FIG. 3, the oscillation stop detection circuit 14 determines that the oscillator circuit 13 is oscillating normally, and does not output the oscillation stop signal.

On the other hand, when a stop of the oscillator circuit 13 is detected, the oscillation stop detection circuit 14 outputs the oscillation stop signal.

First, during the oscillation period of the oscillator circuit 13 (i.e., when the oscillator circuit 13 normally oscillate), the power control circuit 17 receives the clock. Therefore, the PWM signal is generated by the power control circuit 17, and the first transistor 31 and the third transistor 51 are controlled by the PWM signal, so that the output voltage V1 and V3 are set to 6V. Further, the base current of the second transistor 41 and the fourth transistor 61 is controlled by the PWM signal, so that the output voltage V2 and V4 are set to 5V.

Thus, the first switching power source 30, the first series power source 40, the second switching power source 50, and the second series power source 60 are put in an operation state, thereby yielding the output voltages V1 and V3 of 6V and the output voltage V2 and V4 of 5V.

Since the output voltages V2 and V4 (i.e., the power supplied to the main microcomputer 11 and the monitor microcomputer 12) are 5V, each of the reset signals RST1 and RST2 outputted from the voltage detector circuits 18 and 19 show a high level, and the main microcomputer 11 and the monitor microcomputer 12 are not reset.

Therefore, the main microcomputer 11 and the monitor microcomputer 12 are put in the operation state. Thus, the monitor microcomputer 12 monitors the main microcomputer 11.

Normally, the clock is supplied to both of the first drive circuit 20 and the communication circuit 21. Further, the main microcomputer 11 is in the operation state. Therefore, the first drive circuit 20 is put in an ON state, and controls the main relay (i.e., the load 5) to be put in a closed state. The communication circuit 21 performs communications with other ECUs 1 and 2.

Further, the main microcomputer 11 outputs an instruction signal to the second drive circuit 22, for putting the system main relay 6 (i.e., the load) in a closed state. As mentioned above, the monitor microcomputer 12 monitors the main microcomputer 11 and the main microcomputer 11 is the operation state, the monitor microcomputer 12 outputs a drive signal to the second drive circuit 22, allowing the drive of the second drive circuit 22.

Therefore, the AND circuit 23 outputs an instruction signal to the second drive circuit 22, for putting the system main relay 6 in the closed state, and the second drive circuit 22 puts the system main relay 6 in the closed state.

In such manner, the power is supplied to the various devices (e.g., to the inverter) from the driving battery 3.

Next, during the oscillation stop period of the oscillator circuit 13 (i.e., when the oscillation stop detection circuit 14 detects the stop of oscillation and thereafter), the oscillation stop detection circuit 14 outputs the oscillation stop signal to the power control circuit 17, which is a clock supply destination, when the stop of the oscillator circuit 13 is detected.

As described above, the power control circuit 17 controls the first transistor 31, the second transistor 41, and the third transistor 51 to be switched OFF, and controls only the fourth transistor 61 to be switched ON. In such case, as described above, a half-ON control is performed for the fourth transistor 61.

Therefore, the first switching power source 30, the first series power source 40, and the second switching power source 50 are put in the stop state (i.e., no step-down state), while the second series power source 60 continues to be in an operable state (i.e., a step-down enabled state) even after the detection of oscillation stop.

By the release of the energy accumulated in the first capacitor 34, the output voltage V1 of the first switching power source 30 decreases gradually, and eventually falls to 0V. The output voltage V2 of the first series power source 40 steeply decreases (i.e., decreases quicker than the output voltage V1), due to the use of the accumulated energy in the second capacitor 42 by the operation of the main microcomputer 11. The operation guarantee voltage of the main microcomputer 11 is 3.5V, for example. When the output voltage V2 falls to be less than 4V, for the reset of the main microcomputer 11, the voltage detector circuit 18 outputs a low level signal as the reset signal RST1. Therefore, upon having the output voltage V2 to be less than 4V, the main microcomputer 11 is put in a stop state (i.e., in a reset state). Thus, when the stop of oscillation is detected, the main microcomputer 11 stops after a lapse of a preset time from such detection of oscillation stop.

The output voltage V3 of the second switching power source 50 decreases quicker than the output voltage V1, due to the use of the accumulated energy in the third capacitor 54 by the operation of the second series power source 60. Since the second series power source 60 performs a voltage-lowering operation (i.e., a step-down operation) until the output voltage V3 falls to be less than 1.5V, the output voltage V4 decreases slower than the decrease of the output voltage V2, as a result of addition of the amount of the step-down operation (i.e., a part of the energy accumulated in the third capacitor 54) to the energy accumulated in the fourth capacitor 62 at the oscillation stop time. The operation guarantee voltage of the main microcomputer 11 is also 3.5V. When the output voltage V4 falls to be less than 4V, for the reset of the monitor microcomputer 12, the voltage detector circuit 19 outputs a low level signal as the reset signal RST2. Therefore, upon having the output voltage V4 to be less than 4V, the monitor microcomputer 12 is put in a stop state (i.e., in a reset state). However, as described above, the decrease of the output voltage V4 is slower than the decrease of the output voltage V2. Further, the output voltage V4 starts to decrease when the output voltage V3 falls to be 5V (i.e., to the same voltage as the output voltage V4). That is, the fall of the output voltage V4 starts at a later timing than the output voltage V2. Based on the above, the monitor microcomputer 12 stops after the main microcomputer 11 stops.

Further, when the stop of oscillation is detected, the oscillation stop detection circuit 14 outputs the oscillation stop signal also to the first drive circuit 20 and to the communication circuit 21. The first drive circuit 20 is put in the OFF state in which the drive of the load 5 is disabled when the first drive circuit 20 receives the oscillation stop signal. According to the present embodiment, the main relay serving as the load 5 is put in the open state by the first drive circuit 20. Further, the communication circuit 21 is put in the OFF state (i.e., in a recessive state) in which communication is disabled when the communication circuit 21 receives the oscillation stop signal. Thus, the oscillation stop detection circuit 14 puts the first drive circuit 20 and the communication circuit 21 in the OFF state by outputting the oscillation stop signal to both of the first drive circuit 20 and the communication circuit 21.

When the main microcomputer 11 stops, an indication signal outputted from the main microcomputer 11 to the second drive circuit 22 switches to a signal for switching OFF the system main relay 6 which serves as the load. As mentioned above, the monitor microcomputer 12 monitors the main microcomputer 11, and, when the main microcomputer 11 stops (i.e., input in the reset state), the monitor microcomputer 12 outputs a drive prohibition signal. Thus, when the signal of switching OFF is input from the main microcomputer 11 and the drive prohibition signal is inputted from the monitor microcomputer 12, the AND circuit 23 outputs, to the second drive circuit 22, a signal for switching OFF the system main relay 6. Thereby, the second drive circuit 22 puts the system main relay 6 in the open state. Thus, the electrical connection between the driving battery 3 and the various devices is intercepted.

The effects of the electronic control unit 10 concerning the present embodiment are described.

According to the present embodiment, the oscillation stop detection circuit 14 detects the stop of the clock output from the oscillator circuit 13. When the stop of the clock output is detected, the power control circuit 17 switches the second transistor 41 to OFF and switches the fourth transistor 61 to ON. More practically, the fourth transistor 61 is switched ON so that a constant voltage (5V) is outputted. Therefore, the first series power source 40 of the first power circuit 15 is put in the OFF state in which no electric power is supplied therefrom to the main microcomputer 12, and the second series power source 60 of the second power circuit 16 is put in the ON state in which an electric power is supplied therefrom to the monitor microcomputer 12. Thus, when the stop of the clock output is caused, the main microcomputer 11 is stopped prior to the stop of the monitor microcomputer 12, thereby preventing an unmonitored period during which the main microcomputer 11 is not monitored.

When the output of the clock stops, the first drive circuit 20 and the communication circuit 21 stick (i.e., are fixed) to a logic at a time of such stopping of the clock. That is, an ON fix of those circuits is caused, which is not on a safe side (i.e., is not a "safe side" logic). According to the present embodiment, the first drive circuit 20 and the communication circuit 21 are put in the OFF state according to the oscillation stop signal from the oscillation stop detection circuit 14. Thereby, the first drive circuit 20 puts the main relay which serves as the load 5 in the open state (i.e., switches the main relay to OFF). Therefore, a situation in which the switching OFF of the main relay (i.e., the load 5) is disabled due to the ON fix of those circuits is prevented. Further, the communication circuit 21 is put in the recessive state. Therefore, the dominant fix of the communication circuit 21, which disables the communication between ECUs (e.g., between ECU 1 and ECU 2), is prevented.

According to the present embodiment, when the abnormality of the main microcomputer 11 is detected, the monitor microcomputer 12 outputs the drive prohibition signal for stopping the drive of the second drive circuit 22 to the second drive circuit 22. Thus, the second drive circuit 22 is switched to OFF and the system main relay 6 is put in the open state not only at a reset timing of the main microcomputer 11 but also at an input timing of the drive prohibition signal from the monitor microcomputer 12. Therefore, the system main relay 6 is securely switched to OFF (i.e., to the open state with an improved reliability).

Second Embodiment

In the present embodiment, the description of the common part regarding the electronic control unit 10 in the first embodiment is omitted.

According to the present embodiment, if the stop of the clock output is detected, the power control circuit 17 switches the first transistor 31 to OFF, switches the second transistor 41 to OFF, switches the third transistor 51 to ON, and switches the fourth transistor 61 to ON.

Figure 4:
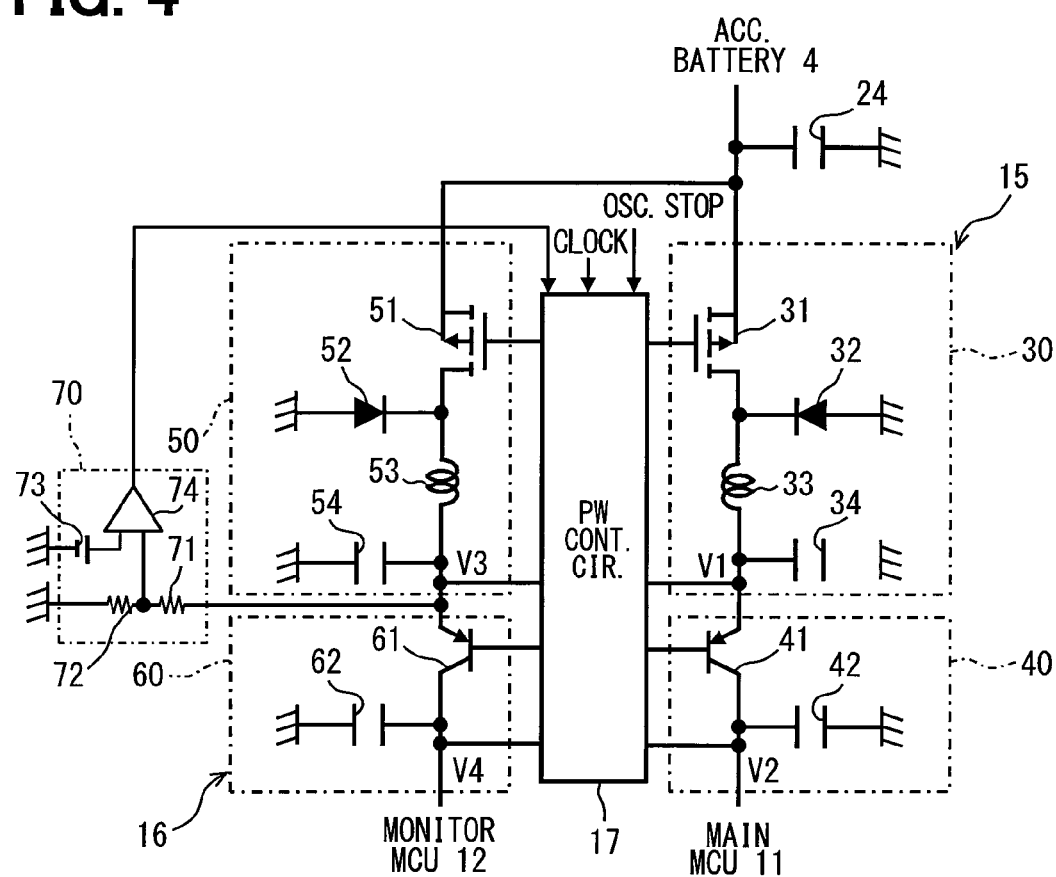
FIG. 4 is a schematic diagram of a power circuit and peripherals of the electronic control unit in a second embodiment of the present disclosure.

Further, the electronic control unit 10 is provided with a voltage detector 70 for detecting the output voltage V3 of the second switching power source 50 as shown in FIG. 4. When the output voltage detected by the voltage detector 70 exceeds a preset threshold value, the power control circuit 17 controls the third transistor 51 to be switched OFF.

The voltage detector 70 includes two resistors 71, 72 that are in series connection between (i) a junction point of the third capacitor 54 and the fourth transistor 61 and (ii) a ground, and a comparator 74 which compares (i) a threshold voltage generated by a reference power source 73 and (ii) a divided voltage divided by the resistors 71 and 72. The comparator 74 outputs an overvoltage signal to the power control circuit 17, when the divided voltage value exceeds the threshold voltage. When the overvoltage signal is inputted, the power control circuit 17 controls the third transistor 51 to be switched to OFF.

Figure 5:
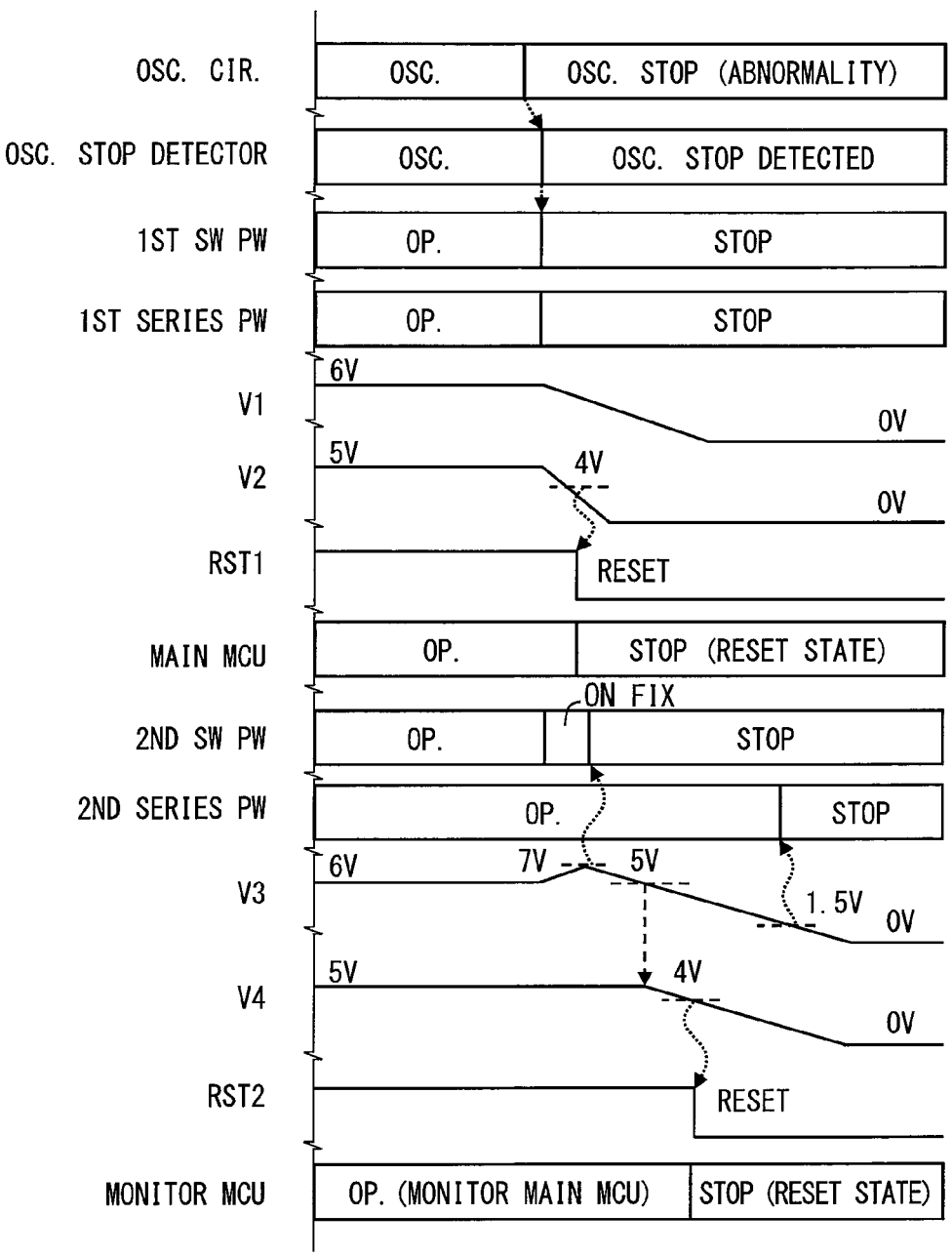
FIG. 5 is a timing chart of an operation state of the main microcomputer and other components.

Based on the timing chart shown in FIG. 5, an operation of the above-mentioned electronic control unit 10 is described. Regarding the first drive circuit 20, the communication circuit 21, the output from the main microcomputer 11 to the second drive circuit 22, and the output from the monitor microcomputer 12 to the second drive circuit 22, which are the same as FIG. 3, the illustration is omitted from FIG. 5. Further, the normal operation, which is the same as the first embodiment, is also omitted from the following description.

The oscillation stop detection circuit 14 outputs the oscillation stop signal to the power control circuit 17 which is a clock supply destination, when the stop of the clock output from the oscillator circuit 13 is detected as shown in FIG. 5. As described above, the power control circuit 17 controls both of the first transistor 31 and the second transistor 41 to be switched OFF. Therefore, the first switching power source 30 and the first series power source 40 are put in the stop state (i.e., a state in which no step-down operation is performable).

Just like the first embodiment, the output voltage V1 of the first switching power source 30 falls gradually, eventually down to 0V. The output voltage V2 of the first series power source 40 falls more steeply than the output voltage V1, due to the use of the accumulated energy in the second capacitor 42 by operation of the main microcomputer 11. When the output voltage V2 falls to be less than 4V, the voltage detector circuit 18 outputs the low level signal as the reset signal RST1. Therefore, when the output voltage V2 falls to be less than 4V, the main microcomputer 11 is put in the stop state (i.e., in the reset state). Thus, the main microcomputer 11 stops after a lapse of a preset time from the detection of oscillation stop.

On the other hand, the power control circuit 17 controls both of the third transistor 51 and the fourth transistor 61 to be switched to ON. Just like the first embodiment, the fourth transistor 61 is switched to ON to output the constant voltage of 5V as the output voltage V4. Since the clock from the oscillator circuit 13 is stopped, the third transistor 51 is controlled to be switched ON, even though a switching operation of the third transistor 51 by a preset duty will not be performed. Thereby, the third transistor 51 is driven by a 100% duty (i.e., is put in an ON fix state). Therefore, after the detection of oscillation stop, the second switching power source 50 is put in an ON fix state after the detection of oscillation stop, and the second series power source 60 continues to be in an operation state after the detection of oscillation stop.

The output voltage V3 of the second switching power source 50 rises up towards the battery voltage of 12V from 6V, which is a voltage before the stop of oscillation. According to the present embodiment, when the output voltage V3 exceeds 7V, the overvoltage signal is outputted from the above-mentioned voltage detector 70. When the overvoltage signal is inputted, the power control circuit 17 controls the third transistor 51 to be switched OFF. After the switching OFF of the third transistor 51, the second series power source 60 operates using the energy accumulated in the third capacitor 54. Thereby, the output voltage V3 starts to fall, and, during such a fall of the output voltage V3, the output voltage V4 starts to fall when the output voltage V3 falls down to 5V at which the output voltage V4 stays. When the output voltage V4 falls to be less than 4V, the voltage detector circuit 19 outputs the low level signal as the reset signal RST2. Therefore, when the output voltage V4 falls to be less than 4V, the monitor microcomputer 12 is put in the stop state (i.e., in the reset state).

Next, the effects of the electronic control unit 10 concerning the present embodiment are described.

In the present embodiment, when the oscillation stop signal is inputted, the power control circuit 17 controls the first transistor 31 to be switched OFF and controls the third transistor 51 to be switched ON. That is, even when the oscillation stop signal is inputted, the step-down operation of the second switching power source 50 is performed. Further, after the stop of the step-down operation, the operation of the second series power source 60 continues by using the energy accumulated in the third capacitor 54. Therefore, a time period between the stop of oscillation and the reset of the monitor microcomputer 12 is reserved as a longer period than the first embodiment. In such operation scheme, the prevention of unmonitored period during which the main microcomputer 11 is not monitored is more securely implemented.

More specifically, when the oscillation stop signal is inputted in the present embodiment, the power control circuit 17 does not put third transistor 51 in an ON fix state (i.e., switches the third transistor 51 to OFF when the overvoltage signal is inputted from the voltage detector 70). Therefore, the output voltage V3 is prevented from rising too much. Thereby, the fall of the voltage in the second series power source 60 is controlled to be small, and the rise of the temperature of the second series power source 60 exceeding the allowable maximum temperature is prevented.

However, when the oscillation stop signal is inputted, the third transistor 51 may also be fixed all the time in an ON state. In such case, the output voltage V3 rises to 12V (i.e., to the battery voltage), and stays at such voltage.

Although, in the present embodiment, the voltage detector 70 is described as a separate circuit that is separated from the power control circuit 17, the voltage detector 70 may be provided as a part of the power control circuit 17.

According to the present embodiment showing one example, when the stop of the clock output is detected, the first transistor 31 is switched to OFF, and the second transistor 41 is switched to OFF, and the third transistor 51 is switched to ON, and the fourth transistor 61 is switched to ON (i.e., a half-ON control).

However, in other examples, a different configuration may be adopted, in which the first transistor 31 is switched to OFF, and the second transistor 41 is switched to ON (i.e., a half-ON control), and the third transistor is switched to ON, and the fourth transistor 61 is switched to ON (a half-ON control).

Figure 6:
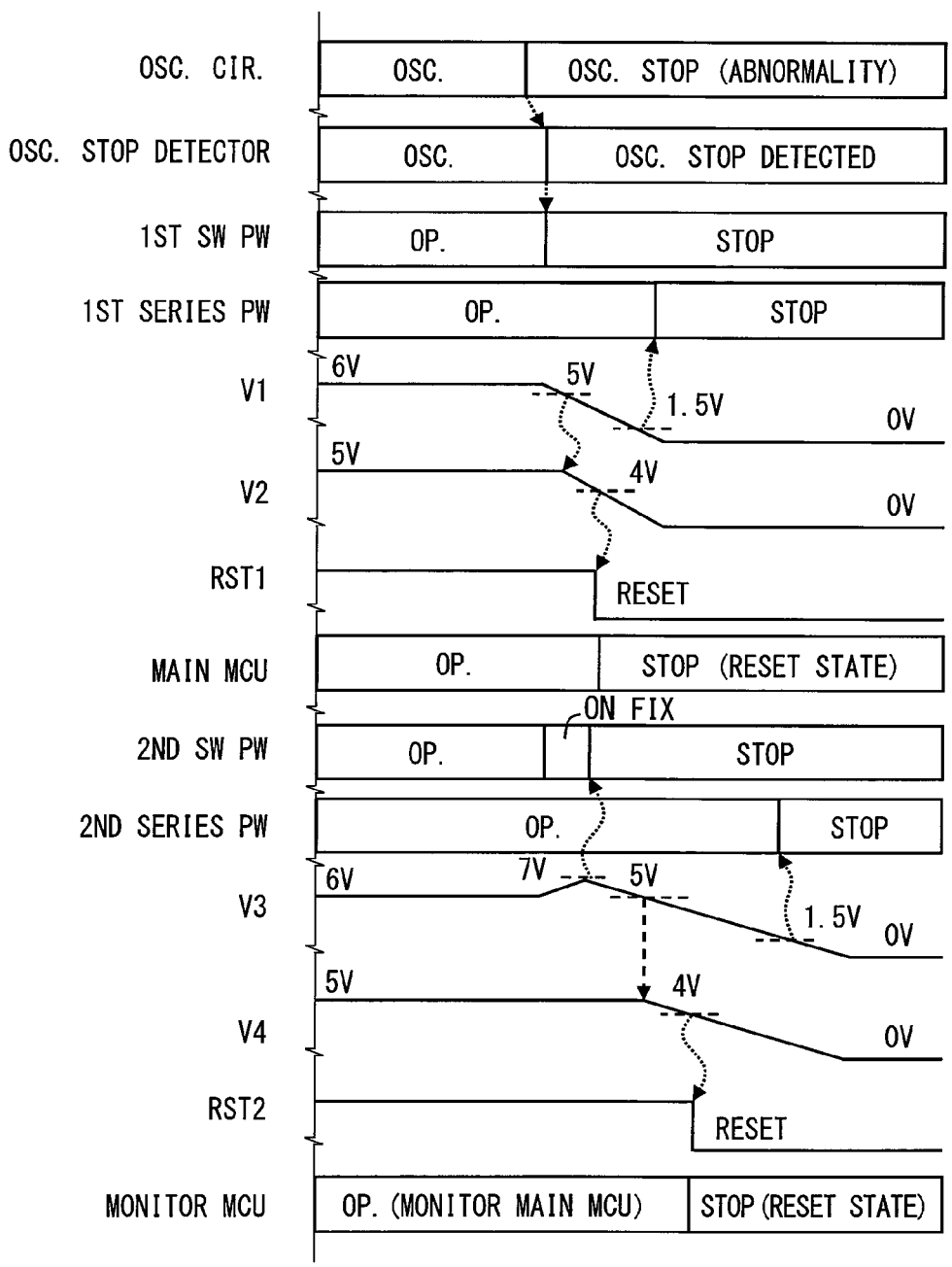
FIG. 6 is a timing chart of the operation state of the main microcomputer and other components in a modification of the first embodiment of the present disclosure.

In such case, as shown in FIG. 6, the stop timing (i.e., the reset timing) of the main microcomputer 11 becomes the same as the stop timing of the monitor microcomputer 12 in the first embodiment (FIG. 3). On the other hand, the stop timing of the monitor microcomputer 12 becomes the same as the above-mentioned timing in FIG. 5. Therefore, before the monitor microcomputer 12 stops, the main microcomputer 11 is stopped.

Further, as shown in FIG. 6, when the overvoltage signal is inputted, the third transistor 51 is controlled to be switched to OFF as described above, thereby the fall of the voltage in the second series power source 60 is controlled to be small, and rise of the temperature of the second series power source 60 exceeding the allowable maximum temperature is prevented.

Third Embodiment

In the present embodiment, the description of the common part regarding the electronic control unit 10 in the first embodiment is omitted.

Figure 7:
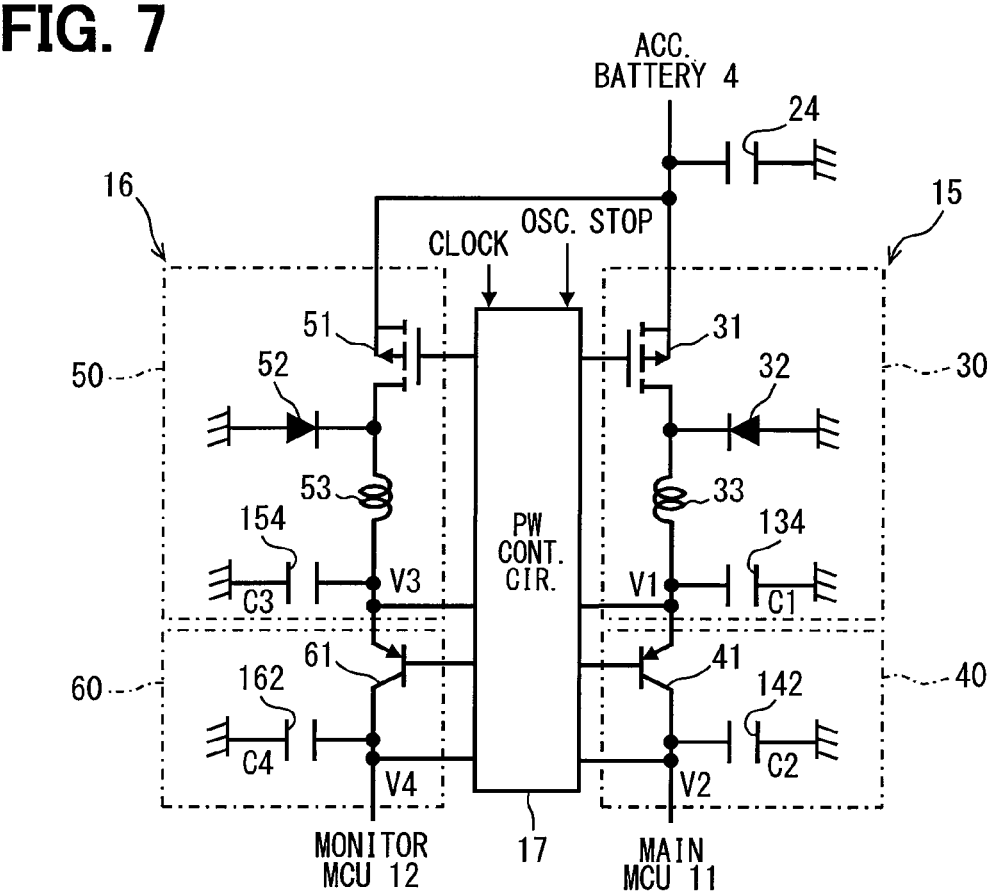
FIG. 7 is a schematic diagram of the power circuit and peripherals of the electronic control unit in a third embodiment of the present disclosure.

In the first embodiment, all of the first capacitor 34, the second capacitor 42, the third capacitor 54, and the fourth capacitor 62 have the same amount of capacity. According to the present embodiment, as shown in FIG. 7, the first switching power source 30 has a first capacitor 134, and the first series power source 40 has a second capacitor 142. The second switching power source 50 has a third capacitor 154, and the second series power source 60 has a fourth capacitor 162. Among those capacitors, the fourth capacitor 162 is configured to have a larger capacity than the second capacitor 142. Further, the third capacitor 154 is configured to have a larger capacity than the first capacitor 134.

According to such configuration, when the stop of oscillation is detected, the energy accumulated in the third capacitor 154 and the fourth capacitor 162 is larger than the first embodiment. Thereby, a time period between the stop of oscillation and the reset of the monitor microcomputer 12 is devised to be longer than the first embodiment. In such operation scheme, the prevention of no-monitoring period during which the main microcomputer 11 is not monitored is more securely implemented.

Further, at least by configuring the fourth capacitor 162 to have the larger capacity than second capacitor 142, the time period to the reset of the monitor microcomputer 12 is reserved as a longer period in comparison to the same capacity configuration, in which the fourth capacitor 162 and the second capacitor 142 have the same capacity.

Further, at least by configuring the third capacitor 154 to have the larger capacity than the first capacitor 134, the time period to the reset of the monitor microcomputer 12 is reserved as a longer period in comparison to the same capacity configuration, in which the third capacitor 154 and the first capacitor 134 have the same capacity.

The configuration of the present embodiment may be combined with the configuration of the second embodiment.

Fourth Embodiment

In the present embodiment, the description of the common part regarding the electronic control unit 10 in the first embodiment is omitted.

Figure 8:
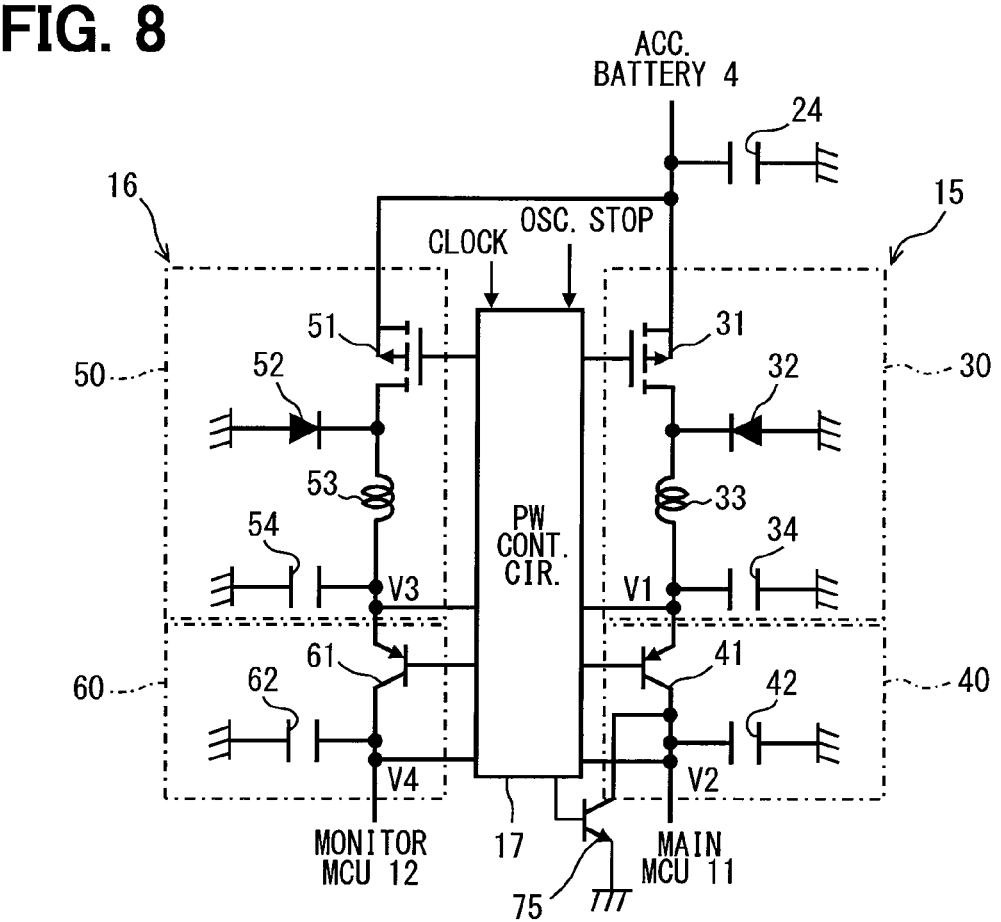
FIG. 8 is a schematic diagram of the power circuit and peripherals of the electronic control unit in a fourth embodiment of the present disclosure.

The electronic control unit 10 of the present embodiment is provided with a transistor 75 which draws (i.e., discharges) the electric charge accumulated in the second capacitor 42 to the ground, when the stop of the clock output is detected as shown in FIG. 8. The transistor 75 corresponds to a discharger.

In FIG. 8, an NPN type bipolar transistor is adopted as the transistor 75.

Further, the collector of the transistor 75 is connected to a junction point of the second transistor 41 and the second capacitor 42, and the emitter of the transistor 75 is connected to the ground. In addition, the base of the transistor 75 is connected to the power control circuit 17, and, when the oscillation stop signal is inputted to the power control circuit 17, the power control circuit 17 controls the base current so that the transistor 75 is switched to ON to discharge the accumulated electric charge in the second capacitor 42 toward the ground.

According to such configuration, a time period between the detection of oscillation stop and the reset of the main microcomputer 11 is decreased when the oscillation stop is detected. Therefore, in such operation scheme, the prevention of no-monitoring period during which the main microcomputer 11 is not monitored is more securely and effectively implemented.

Further, the configuration of the present embodiment may be combined with the configurations of the second and third embodiments (i.e., the second capacitor 142).

Although the present disclosure has been described in connection with preferred embodiment thereof with reference to the accompanying drawings, it is to be noted that various changes and modifications will become apparent to those skilled in the art.

The monitoring unit is not necessarily limited to the monitor microcomputer 12. For example, a monitoring circuit may be provided in the power IC 25 as a hard-logic circuit.

The electronic control unit 10 is not necessarily limited to an HVECU.

The circuit driven by the instruction from the main microcomputer 11 by using the clock is not necessarily limited to a combination of the first drive circuit 20 which drives the main relay as the load 5 and the communication circuit 21.

The circuit driven by the instruction of the main microcomputer 11 is not necessarily limited to the second drive circuit 22 which drives the system main relay 6.

Such changes, modifications, and summarized schemes are to be understood as being within the scope of the present disclosure as defined by appended claims.

What is claimed is:

1. An electronic control unit comprising:
   a microcomputer;
   a monitoring unit monitoring the microcomputer;
   an oscillator circuit generating and outputting a clock;
   a microcomputer power circuit including:
      a switching power source having a first transistor that switchingly operates on a clock-generated signal and lowering a voltage from an external power source; and
      a series power source having a second transistor that lowers an output voltage of the switching power source and supplying the output voltage to the microcomputer;
   a monitor power circuit including:
      a switching power source having a third transistor that switchingly operates on a clock-generated signal and lowering a voltage from the external power source; and
      a series power source having a fourth transistor that lowers an output voltage of the switching power source and supplying the output voltage to the monitoring unit;
   a control circuit controlling each of the transistors; and
   an oscillation stop detection circuit detecting a stop of a clock output from the oscillator, wherein
   the control circuit performs a control to switch the second transistor to ON and to switch the fourth transistor to ON when the stop of the clock output is detected.

2. The electronic control unit of claim 1, wherein
   when the stop of the clock output is detected, the control circuit performs a control to switch the first transistor to OFF and to switch the third transistor to ON in a switching stop state.

3. An electronic control unit comprising:
   a microcomputer;
   a monitoring unit monitoring the microcomputer;
   an oscillator circuit generating and outputting a clock;
   a microcomputer power circuit including:
      a switching power source having a first transistor that switchingly operates on a clock-generated signal and lowering a voltage from an external power source; and
      a series power source having a second transistor that lowers an output voltage of the switching power source and supplying the output voltage to the microcomputer;
   a monitor power circuit including:
      a switching power source having a third transistor that switchingly operates on a clock-generated signal and lowering a voltage from the external power source; and
      a series power source having a fourth transistor that lowers an output voltage of the switching power source and supplying the output voltage to the monitoring unit;
   a control circuit controlling each of the transistors; and
   an oscillation stop detection circuit detecting a stop of a clock output from the oscillator, wherein
   the control circuit performs, in a switching operation stopped state of the transistors, a control to switch the first transistor to OFF, to switch the second transistor to ON, to switch the third transistor to ON, and to switch the fourth transistor to ON when the stop of the clock output is detected.

4. The electronic control unit of claim 2, further comprising:
a voltage detection circuit detecting an output voltage of the switching power source of the monitor power circuit, wherein
the control circuit performs a control to switch the third transistor to OFF when the output voltage detected by the voltage detection circuit is equal to or greater than a threshold.

5. The electronic control unit of claim 1 further comprising:
a driven circuit being driven according to an instruction from the microcomputer and by using the clock, wherein
the drive of the driven circuit stops when the stop of the clock output is detected.

6. The electronic control unit of claim 1 further comprising:
a drive circuit driving a load according to an instruction from the microcomputer, wherein
the monitoring unit outputs a drive stop signal that stops the drive of the drive circuit when an abnormality of the microcomputer is detected.

7. The electronic control unit of claim 1 further comprising:
a first capacitor storing an electric charge that corresponds to the output voltage of the switching power source of the microcomputer power circuit;
a second capacitor storing an electric charge that corresponds to the output voltage of the series power source of the microcomputer power circuit;
a third capacitor storing an electric charge that corresponds to the output voltage of the switching power source of the monitor power circuit; and
a fourth capacitor storing an electric charge that corresponds to the output voltage of the series power source of the monitor power circuit, wherein
a capacity of the fourth capacitor is greater than a capacity of the second capacitor.

8. The electronic control unit of claim 1 further comprising:
a first capacitor storing an electric charge that corresponds to the output voltage of the switching power source of the microcomputer power circuit;
a second capacitor storing an electric charge that corresponds to the output voltage of the series power source of the microcomputer power circuit;
a third capacitor storing an electric charge that corresponds to the output voltage of the switching power source of the monitor power circuit; and
a fourth capacitor storing an electric charge that corresponds to the output voltage of the series power source of the monitor power circuit, wherein
a capacity of the third capacitor is greater than a capacity of the first capacitor.

9. The electronic control unit of claim 1 further comprising:
a capacitor storing an electric charge that corresponds to the output voltage of the series power source of the microcomputer power circuit; and
a discharger discharging the electric charge stored in the capacitor when the stop of the clock output is detected.

* * * * *